(12) United States Patent
Spenninger et al.

(10) Patent No.: US 12,280,503 B2
(45) Date of Patent: Apr. 22, 2025

(54) METHOD FOR OPERATING A ROBOT MANIPULATOR WITH INCREASED MASS OF A LOAD

(71) Applicant: Franka Emika GmbH, Munich (DE)

(72) Inventors: Andreas Spenninger, Karlsfeld (DE); Mohamadreza Sabaghian, Munich (DE)

(73) Assignee: Franka Emika GmbH, Munich (DE)

( * ) Notice: Subject to any disclaimer, the term of this patent is extended or adjusted under 35 U.S.C. 154(b) by 161 days.

(21) Appl. No.: 17/630,677

(22) PCT Filed: Aug. 11, 2020

(86) PCT No.: PCT/EP2020/072453
§ 371 (c)(1),
(2) Date: Jan. 27, 2022

(87) PCT Pub. No.: WO2021/028413
PCT Pub. Date: Feb. 18, 2021

(65) Prior Publication Data
US 2022/0266447 A1  Aug. 25, 2022

(30) Foreign Application Priority Data
Aug. 12, 2019 (DE) .................. 10 2019 121 628.1

(51) Int. Cl.
*B25J 9/16* (2006.01)
(52) U.S. Cl.
CPC .................. *B25J 9/1633* (2013.01)
(58) Field of Classification Search
CPC ...... B25J 9/1633; B25J 9/1638; B25J 13/085; B25J 9/1612; B25J 9/04; B25J 9/1664; B25J 13/00; B66C 13/18; B66C 13/23
See application file for complete search history.

(56) References Cited

U.S. PATENT DOCUMENTS

| | | | |
|---|---|---|---|
| 6,678,582 B2 * | 1/2004 | Waled | B25J 9/161 700/262 |
| 2002/0008075 A1 | 1/2002 | Handroos et al. | |

(Continued)

FOREIGN PATENT DOCUMENTS

| | | |
|---|---|---|
| DE | 60113777 T2 | 6/2006 |
| DE | 102007059480 A1 | 6/2009 |

(Continued)

OTHER PUBLICATIONS

English translation of International Preliminary Report on Patentability issued in International Application No. PCT/EP2020/072453 on Feb. 24, 2022.

*Primary Examiner* — Sohana Tanju Khayer
*Assistant Examiner* — Dylan M Katz
(74) *Attorney, Agent, or Firm* — Hoffmann & Baron, LLP

(57) ABSTRACT

A method of operating a robot manipulator including: ascertaining a wrench or joint torque vector based on a weight force and/or based on an inertial force of a mass of a load on an end effector of the robot manipulator; ascertaining a maximum permissible workspace and/or a maximum permissible kinematic variable, in each case based on the wrench or joint torque vector such that the wrench or joint torque vector does not exceed a predetermined metric within the maximum permissible workspace; and activating the robot manipulator to execute a predetermined task in consideration of the maximum permissible kinematic variable, such that the end effector or the load on the end effector remains within the maximum permissible workspace if, at beginning of execution of the task, the end effector or the load on the end effector is located within the maximum permissible workspace.

21 Claims, 1 Drawing Sheet

(56) References Cited

U.S. PATENT DOCUMENTS

| | | | |
|---|---|---|---|
| 2011/0060462 A1* | 3/2011 | Aurnhammer | B25J 9/1674 |
| | | | 700/255 |
| 2014/0052294 A1* | 2/2014 | Herre | G05B 19/404 |
| | | | 901/43 |
| 2014/0081461 A1* | 3/2014 | Williamson | B25J 9/1643 |
| | | | 700/261 |
| 2015/0039129 A1* | 2/2015 | Yasuda | B25J 9/1633 |
| | | | 700/258 |
| 2015/0314445 A1 | 11/2015 | Naitou et al. | |
| 2016/0375588 A1 | 12/2016 | Ueberle et al. | |
| 2017/0036894 A1* | 2/2017 | Braun | B66C 13/18 |
| 2017/0112580 A1* | 4/2017 | Griffiths | A61B 34/35 |
| 2018/0286741 A1 | 10/2018 | Ueda | |
| 2020/0001456 A1 | 1/2020 | Golz | |
| 2020/0198137 A1* | 6/2020 | Nakasu | B25J 9/1664 |
| 2021/0114211 A1* | 4/2021 | Knott | B25J 19/063 |
| 2022/0009097 A1* | 1/2022 | Pyrkin | B25J 9/1607 |

FOREIGN PATENT DOCUMENTS

| | | |
|---|---|---|
| DE | 102015005212 A1 | 11/2015 |
| DE | 202014010055 U1 | 4/2016 |
| DE | 102015008144 A1 | 12/2016 |
| DE | 102017102621 B3 | 5/2018 |
| EP | 2072195 A1 | 6/2009 |
| EP | 2292388 A1 | 9/2011 |

* cited by examiner

METHOD FOR OPERATING A ROBOT MANIPULATOR WITH INCREASED MASS OF A LOAD

CROSS-REFERENCE TO RELATED APPLICATIONS

The present application is the U.S. National Phase of PCT/EP2020/072453, filed on 11 Aug. 2020, which claims priority to German Patent Application No. 10 2019 121 628.1, filed on 12 Aug. 2019, the entire contents of which are incorporated herein by reference.

FIELD

The invention relates to a method for operating a robot manipulator, and a robot system having a robot manipulator having an end effector and a control unit for executing the method.

RELATED ART

The following items of information are not necessarily part of specific prior art, but rather result by way of routine considerations by a person skilled in the art on the mechanism of robot manipulators. An additional mass of a load on an end effector of a robot manipulator generates a torque, which acts on the base of the robot manipulator and in general on the joints of the robot manipulator. If the mass of this load is very large in comparison to the mechanical design of the robot manipulator, the tensile limit or yield point of materials in the limbs or at the joints, in particular, a gear or a torque sensor, of the robot manipulator can be reached at any time. It is therefore obvious to define a highest permissible mass for the load on the end effector. However, this restricts the operation of the robot manipulator to the handling of just this highest permissible mass of the load.

SUMMARY

It is therefore the object of the invention to overcome the aforementioned disadvantage and also operate loads of higher mass on the end effector of the robot manipulator.

The invention result from the features of the independent claims. Advantageous refinements and embodiments are the subject matter of the dependent claims.

A first aspect of the invention relates to a method of operating a robot manipulator, the method including:

ascertaining a wrench or joint torque vector based on a weight force of a mass and/or on the basis of a force induced by an inertia of the mass of a load arranged on an end effector of the robot manipulator, ascertaining a maximum permissible workspace and/or a maximum permissible kinematic variable of the end effector or optionally the load in each case based on the wrench or joint torque vector, wherein the maximum permissible workspace specifies a range for permissible positions of the end effector or optionally the load on the end effector, so that the wrench or the joint torque vector does not exceed a predetermined metric within the maximum permissible workspace, and activating the robot manipulator via a control unit to execute a predetermined task in consideration of the maximum permissible kinematic variable, such that the end effector or optionally the load on the end effector remains within the maximum permissible workspace if, at the beginning of the execution of the predetermined task, the end effector or optionally the load on the end effector is located inside the maximum permissible workspace.

The wrench or the joint torque vector is respectively ascertained on the basis of a weight force of the mass and/or the force induced by the inertia of the mass of the load arranged on the end effector of the robot manipulator. The wrench, in particular, indicates a force, more preferably additionally or alternatively preferably only a torque, in particular, in relation to an Earth-fixed and preferably Cartesian coordinate system. The mass itself generates a weight force in the gravitational field of the Earth, which generates a torque on the joints of the robot manipulator and on the base of the robot manipulator. In the static case, the mass of the load is only responsible for the weight force. In contrast, in the dynamic case, that is to say when the robot manipulator moves, an inertial force also acts due to the inertia of the mass of the load on the end effector, in particular, a centrifugal force upon a uniform circular movement of the robot manipulator, a Coriolis force upon change of the resulting inertial torque of the load of the end effector, and in the case of an accelerated movement of the robot manipulator on its path, the force which results from the inertia of the mass against the acceleration. The joint torque vector is the vector from the joint torques correlated with the wrench.

The ascertainment of the wrench can therefore take place very easily for all static cases in addition to the predictive ascertainment, as soon as the mass of the load on the end effector is known. This is because the weight force of the load is also known. The ascertainment of the wrench or the torque vector on the basis of the inertia of the mass of the load on the end effector, in contrast, is, in particular, carried out predictively on the basis of the planned task or a group of tasks, wherein, in particular, a trajectory and therefore also the respective path curve of the load on the end effector and the planned accelerations of the load on the end effector are derivable from the respective task.

The wrench or the joint torque vector which is ascertained therefore does not necessarily have to really exist on the robot manipulator, but rather can also be a predictively ascertained hypothetical wrench or joint torque vector which would occur upon corresponding execution of the task or upon corresponding arrangement of the load on the end effector of the robot manipulator.

The maximum permissible kinematic variable of the end effector or optionally the load on the end effector is, in particular, a velocity or an acceleration of the end effector or optionally the load on the end effector. It plays only a subordinate role or no role for the concept of the invention whether the end effector or the load on the end effector is observed.

The workspace is preferably a spherical space having sphere center point inside or in the region of the base of the robot manipulator, alternatively preferably a cuboid space. Furthermore, ellipsoids or parts thereof are possible. Further shapes are possible, depending on the computing method and the accuracy with which the workspace is ascertained. The workspace can thus also be ascertained only approximately and a predefined finite number of cuboid or spherical or other regions having different volumes can be provided to select the respective closest matching approximation from this finite number.

At least if the end effector or optionally the load on the end effector is located within the maximum permissible workspace at the beginning of execution of the task, the control unit connected to the robot manipulator ascertains the predetermined tasks so that the ascertained maximum permissible workspace and the maximum permissible kinematic variable are complied with. For this purpose, the task can be limited beyond these maximum permissible geometric and kinematic ranges, modified, or at least an instruction can be given to the user of how the object would be modified so that these geometric or kinematic ranges are not exceeded.

If the end effector or optionally the load on the end effector is not within the maximum permissible workspace at the beginning of the execution of the task, the task is thus preferably not executed at all, or alternatively preferably for this purpose upon the signals of the control unit, the robot manipulator and, in particular, the end effector or optionally the load on the end effector is moved back into the geometrical maximum permissible workspace at a velocity and/or an acceleration which is within the permissible respective kinematic variable, and, in particular, subsequently the execution of the task is begun by the control unit.

The predetermined metric is, in particular, a limiting value for a torque which is exerted on the base, that is to say, in particular, the pedestal, of the robot manipulator by the weight force of the load, wherein the predetermined metric can be specified from the radius of a vertical axis extending through the base of the robot manipulator toward the load multiplied by the mass of the load. If the mass of the load is, in particular, constant and known, the metric can thus also solely consist of a limiting value which is compared to this radius.

It is an advantageous effect of the invention that a robot manipulator which is limited for general operation to a highest-permissible mass for a load on the end effector can also be operated having higher masses on the end effector.

According to one advantageous embodiment, the maximum permissible workspace and/or the maximum permissible kinematic variable of the end effector or optionally the load of the end effector are each ascertained on the basis of a mass distribution of the robot manipulator and/or a center of gravity of the robot manipulator and/or a mass of the end effector of the robot manipulator and/or a center of gravity of the end effector. To determine the total torque acting on the base or also on the limbs or also the joints of the robot manipulator, the total mass distribution of the robot manipulator together with the end effector and the mass of the load is necessary. Whether an explicit mass distribution is ascertained or the mass distribution is summarized in individual centers of gravity of the elements of the robot manipulator or in an overall center of gravity of the robot manipulator and is observed using a corresponding inertial sensor only plays a subordinate role. This embodiment advantageously enables the maximum permissible workspace and/or the maximum permissible kinematic variable to be ascertained as a function of a maximum predefined torque on a corresponding element of the robot manipulator (base, gear, joint, torque sensor, limb, . . . ).

According to a further advantageous embodiment, the weight force of the mass of the load is ascertained by static or dynamic system identification. In static system identification, the robot manipulator is left in an idle position, and a respective joint torque is preferably detected by torque sensors, in particular, in the joints of the robot manipulator, and the weight force is ascertained therefrom and in turn the mass of the load is ascertained therefrom. Other force and/or torque sensors known in the prior art can be used to detect the weight force of the load and to ascertain the mass of the load therefrom. In dynamic system identification, in particular, a sinusoidal signal having a frequency rising over time is predefined as an input signal for at least one actuator of the robot manipulator, and the response of the robot manipulator or also the manipulated variable generated by the regulator of the robot manipulator, in particular, an amperage of an electrical actuator, is detected. In the case of the detected kinematic response of the robot manipulator, a spectrum of the input signal and a spectrum of the output signal result, which, upon corresponding signal processing and division of the spectra by one another, supply a frequency response, from which the mass of the load of the end effector can be read, or can be approximated on a mass model by optimization methods, in that parameters of the mass model, in particular, of the robot manipulator including the mass of the load, are approximated to one another to minimize the error between the mass model and the frequency response. In this embodiment, the mass of the load advantageously does not have to be predetermined and communicated to the control unit of the robot manipulator, but rather the control unit of the robot manipulator is itself capable with the aid of corresponding sensors on the robot manipulator of ascertaining the exact mass of the load on the end effector of the robot manipulator.

According to a further advantageous embodiment, the robot manipulator is activated to execute the predetermined task in consideration of the maximum permissible workspace by predetermining virtual walls at the boundaries of the maximum permissible workspace, wherein to generate the virtual walls, the robot manipulator is activated so that it exerts a force directed away from the virtual walls on the robot manipulator during the manual guiding of the robot manipulator. The force directed away from the virtual walls can either rise gradually, so that the user, during the manual guiding of the robot manipulator, perceives a soft transition in the direction of the respective virtual wall via an increasing resistance of the robot manipulator to the guiding of the robot manipulator toward the virtual wall, alternatively preferably thereto the virtual wall is a hard boundary, so that a sudden counterforce of the robot manipulator occurs at the virtual wall, as the user would experience upon actually manually guiding the robot manipulator against a physical wall. This embodiment advantageously permits intuitive assistance of the manual guiding of the user, so that the user intuitively receives feedback about which geometric boundaries of the workspace are already defined. The virtual walls can be implemented not only in the Cartesian Earth-fixed coordinate system, but also as artificial stops on a respective joint, so that in the latter case the angle ranges of a respective joint are artificially limited.

According to a further advantageous embodiment, the activation of the robot manipulator to execute the predetermined task in consideration of the maximum permissible workspace and/or the maximum permissible kinematic variable includes the activation of brakes of the robot manipulator, wherein the brakes of the robot manipulator are only opened starting from a closed state when the end effector or optionally the load on the end effector is located within the permissible workspace at the beginning of the execution of the task. For example, if a load having a nominally impermissible mass is arranged by the user on the end effector, the brakes can thus, in particular, remain closed to protect gears on the joints of the robot manipulator, if the mass of the load would impermissibly damage, for example, the gear of the robot manipulator solely due to its weight force. This advantageously lengthens the service life of the robot manipulator and, in particular, the gear of the robot manipulator, or advantageously prevents the premature shortening of the service life of the robot manipulator.

According to a further advantageous embodiment, the maximum permissible workspace and/or the maximum permissible kinematic variable is ascertained on the basis of a trajectory of the robot manipulator predefined by the predetermined task and on the basis of the inertial tensor of the robot manipulator and/or the end effector and/or the load occurring over the trajectory, in that a time-dependent acceleration of the robot manipulator and/or the end effector and/or the load is ascertained from the predefined trajectory and in that the time-dependent inertial tensor of the robot manipulator and/or the end effector and/or the load is ascertained from the time-dependent pose of the robot manipulator dependent on the predefined trajectory. The trajectory of the robot manipulator, in particular, has the information of a path curve and furthermore preferably additionally has time information assigned to the path curve, so that the concept of the trajectory of the robot manipulator preferably not only includes the geometric path of the end effector or the load, but also the respective velocities and/or accelerations occurring during the travel of the path curve. Sufficiently many items of kinematic information are thus provided to ascertain a dynamic torque, caused by the inertia of the mass of the load, and to not only take the weight force of the mass of the loads into consideration during the operation of the robot manipulator and, in particular, during the execution of the predetermined task, but also the dynamic forces which result in a torque on the limbs, joints, and on the base of the robot manipulator.

According to a further advantageous embodiment, the method includes the following:
  checking the predetermined task for leaving of the maximum permissible workspace by the end effector or optionally by the load and/or for exceeding the maximum permissible kinematic variable of the end effector or optionally the load, and
  outputting an instruction to a user at an output unit of how the task can be changed so that during the execution of the task the maximum permissible workspace is not left by the end effector or optionally by the load and/or the maximum permissible kinematic variable of the end effector or optionally the load is not exceeded.

The output unit is preferably a display screen, on which it is visualized to the user, preferably via arrows, how the task could be changed so that the maximum permissible workspace and the maximum permissible kinematic variable are not exceeded during the execution of the task. The user thus advantageously receives intuitive feedback about how the task would be changed so that, in particular, the service life of the robot manipulator is not unnecessarily reduced upon the execution of the task with a load exceeding the nominally permissible load or the safe operation of the robot manipulator is still ensured.

According to a further advantageous embodiment, the maximum permissible workspace and/or the maximum permissible kinematic variable is ascertained by a search algorithm of nonlinear optimization. If an analytical solution is possible to ascertain the maximum permissible workspace and/or the maximum permissible kinematic variable, methods of nonlinear optimization thus advantageously suggest themselves to find a corresponding restriction. The methods of nonlinear optimization are, in particular, systematic search algorithms, such as gradient-based methods, methods of quadratic optimization, genetic and evolution algorithms, and mixed forms of those mentioned. Restrictions of the nonlinear optimization are given, in particular, by maintaining the predetermined metric and maintaining the permissible kinematic variable.

According to a further advantageous embodiment, a starting point of the search algorithm is that angle position of the second joint, counted from the distal limb of the robot manipulator, on which the influence of gravity on the torque on the second joint is maximum. In particular, this angle position is determinable offhand by a person skilled in the art by knowing the mechanical situation on the robot manipulator. In particular, while fixing the third joint counted from the distal limb of the robot manipulator, the second joint is then preferably perturbed, preferably within a cone having vertical axis of rotational symmetry, to obtain a reduction of the load on the second joint.

A further aspect of the invention relates to a robot system having a robot manipulator having an end effector and a control unit, wherein the control unit is embodied to ascertain a wrench or joint torque vector on the basis of a weight force of a mass and/or on the basis of a force induced by the inertia of the mass of a load arranged on an end effector of the robot manipulator, and is embodied to ascertain a maximum permissible workspace and/or a maximum permissible kinematic variable of the end effector or optionally the load, each on the basis of the wrench or joint torque vector, wherein the maximum permissible workspace specifies a range for permissible positions of the load on the end effector or of the end effector, so that the wrench or the joint torque vector does not exceed a predetermined metric within the workspace, and to activate the robot manipulator by way of a control unit to execute a predetermined task in consideration of the maximum permissible kinematic variable and to execute the predetermined task so that the end effector or optionally the load on the end effector remains within the maximum permissible workspace if, at the beginning of the execution of the task, the end effector or optionally the load on the end effector is located within the maximum permissible workspace.

Advantages and preferred refinement of the proposed robot system result by way of an analogous and corresponding transfer of the statements made above in conjunction with the proposed method.

Further advantages, features, and details result from the following description in which—possibly with reference to the drawings—at least one example embodiment is described in detail. Identical, similar, and/or functionally identical parts are provided with identical reference numerals.

DETAILED DESCRIPTION

Figure 1:
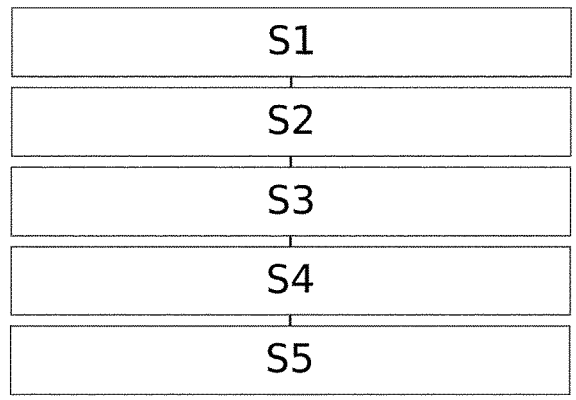
FIG. 1 shows a method according to one example embodiment of the invention.

FIG. 1 shows a method for operating a robot manipulator 1. The method of FIG. 1 is executed on a robot system 100, as described in FIG. 2. Therefore, the explanations of FIG. 2 can also be used in the following description. The method has the following steps in this case:
  Ascertaining S1 a wrench or joint torque vector on the basis of a weight force of a mass and a force induced by the inertia of the mass of a load 5 arranged on an end effector 3 of the robot manipulator 1. The weight force of the mass of the load 5 is ascertained by static system identification. That is to say, after the load 5 is arranged by a user on the end effector 3, the torque sensors arranged in the joints of the robot manipulator 1 detect a torque and the mass of the load 5 is obtained via the current joint angle of the robot manipulator 1 from the known mass distribution of the robot manipulator 1 and the end effector 3. The force of the load 5 arranged on the end effector 3 of the robot manipulator 1 induced by the inertia of the mass, in contrast, is ascertained predictively in that the predetermined task is analyzed and a trajectory is ascertained for the end effector 3 or for the load 5.

Ascertaining S2 a maximum permissible workspace and a maximum permissible kinematic variable of the end effector 3, each on the basis of the wrench or joint torque vector, wherein the maximum permissible workspace specifies a range for permissible positions of the end effector 3, so that the wrench or the joint torque vector does not exceed a predefined limiting value within the workspace. The maximum permissible workspace and the maximum permissible kinematic variable of the end effector 3 are each ascertained on the basis of a mass distribution of the robot manipulator 1 and a mass distribution of the end effector 3 and on the basis of a mass and an inertial tensor of the load 5. Due to the completely known mass distribution of all elements of the robot manipulator 1 including the load 5, a torque on the base of the robot manipulator 1 is known by way of the integral of all mass elements over the radii. The maximum permissible workspace and the maximum permissible velocity and acceleration of the end effector 3 are now generated by a gradient-based search method. In the gradient-based method, further search points are ascertained around a starting point at a certain distance in the target function to comply with the predetermined metric, namely the limiting value in the torque on the base of the robot manipulator 1. A gradient is ascertained from these search points and multiplied by a predefined length of the gradient to obtain the next step. This method is iteratively repeated until the algorithm has converged and the absolute value of the gradient has fallen below a certain threshold value. A cylindrical range for limiting the maximum permissible workspace results from this calculation. Furthermore, the maximum permissible velocity and acceleration of the end effector 3 are ascertained on the basis of a trajectory of the robot manipulator 1 predefined by the predetermined task and on the basis of the inertial tensor of the robot manipulator 1 and the end effector 3 and the load 5 occurring over the trajectory. This is carried out in consideration of the already ascertained maximum permissible workspace. The predefined trajectory supplies a time-dependent acceleration of the robot manipulator 1 and the end effector 3 and the load 5. All moments of inertia and accelerations are then known from the time-dependent pose of the robot manipulator 1, which is dependent on the predefined trajectory, of the time-dependent inertial tensor of the robot manipulator 1 and the end effector 3 and the load 5.

Checking S3 the predetermined task for leaving the maximum principal workspace by the end effector 3 and for exceeding the maximum permissible kinematic variable of the end effector 3.

Outputting S4 a visual instruction in the form of an arrow to a user on a display screen 11 of a user computer connected to the control unit 7 of how the task can be changed by the users so that upon the execution of the task, the maximum permissible workspace is not left by the end effector 3 and/or the maximum permissible kinematic variable of the end effector 3 is not exceeded.

Activating S5 the robot manipulator 1 by way of a control unit 7 to execute a predetermined task in consideration of the maximum permissible kinematic variable and such that the end effector 3 or optionally the load 5 on the end effector 3 remains within the maximum permissible workspace if, at the beginning of the execution of the task, the end effector 3 or optionally the load 5 on the end effector 3 is located within the maximum permissible workspace. The ascertained cylindrical workspace is used as the foundation to generate virtual walls on the lateral surface of the cylinder. The robot manipulator 1 is activated to execute the predetermined task so that to generate virtual walls of the robot manipulator 1, a force directed away from the virtual wall is exerted on the robot manipulator 1 during the manual guiding of the robot manipulator 1. If the load 5 is located outside the lateral surface of the cylindrical workspace at the beginning of the execution of the task, the brakes 9 of the robot manipulator 1 are thus not released at all. A notice is displayed to the user for this purpose on the display screen 11 that the load 5 is located outside the permissible workspace.

Figure 2:
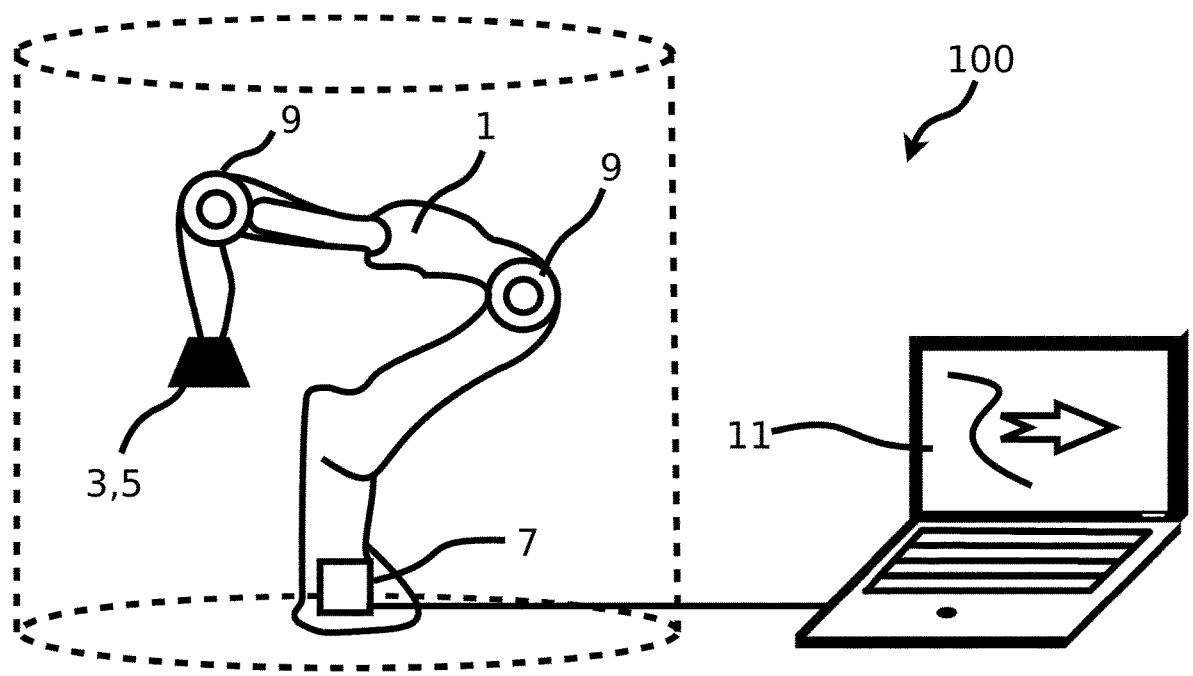
FIG. 2 shows a robot system according to a further example embodiment of the invention.
The illustrations in the figures are schematic and are not to scale.

FIG. 2 shows a robot system 100. The robot system 100 is embodied, in particular, to execute the method of FIG. 1 and has a robot manipulator 1 having an end effector 3 and a control unit 7, wherein the control unit 7 is embodied to ascertain a wrench or joint torque vector on the basis of a weight force of a mass and/or a force induced by the inertia of the mass of a load 5 arranged on an end effector 3 of the robot manipulator 1, and is embodied to ascertain a maximum permissible workspace and/or a maximum permissible kinematic variable of the end effector 3 or optionally the load 5, each on the basis of the wrench or joint torque vector, wherein the maximum permissible workspace specifies a range for permissible positions of the load 5 on the end effector 3 or of the end effector 3, so that the wrench or the joint torque vector does not exceed a predetermined metric within the workspace, and is embodied to activate the robot manipulator 1 by way of a control unit 7 to execute a predetermined task in consideration of the maximum permissible kinematic variable and to execute the predetermined tasks such that the end effector 3 or optionally the load 5 on the end effector 3 remains within the maximum permissible workspace if, at the beginning of the execution of the task, the end effector 3 or optionally the load 5 on the end effector 3 is located within the maximum permissible workspace.

Although the invention was illustrated and explained in more detail by preferred example embodiments, the invention is not thus restricted by the disclosed examples and other variations can be derived therefrom by a person skilled in the art without leaving the scope of protection of the invention. It is therefore clear that a variety of possible variations exist. It is also clear that embodiments mentioned as examples actually only represent examples which are not to be interpreted in any way as a restriction of, for example, the scope of protection, the possible applications, or the configuration of the invention. Rather, the preceding description and the description of the figures make a person skilled in the art capable of specifically implementing the example embodiments, wherein a person skilled in the art knowing the disclosed concept of the invention can perform manifold modifications, for example, with respect to the function or the arrangement of individual elements mentioned in one example embodiment without leaving the scope of protection defined by the claims and their legal equivalents, such as more extensive explanations in the description.

LIST OF REFERENCE NUMERALS 1 robot manipulator
3 end effector
5 load
7 control unit
9 brakes
11 output unit
100 robot system
S1 ascertain
S2 ascertain
S3 check
S4 output
S5 activate

The invention claimed is:

1. A method of operating a robot manipulator, the method comprising:
  ascertaining a wrench or joint torque vector based on a weight force of a mass and/or based on a force induced by inertia of a mass of a load on an end effector of the robot manipulator;
  ascertaining a maximum permissible workspace and a maximum permissible kinematic variable of the end effector or the load, in each case based on the wrench or joint torque vector, wherein the maximum permissible workspace specifies a range for permissible positions of the end effector or the load, such that the wrench or joint torque vector does not exceed a predetermined metric within the maximum permissible workspace;
  wherein the predetermined metric is a limiting value for a torque exerted on a base of the robot manipulator by the weight force of the load, wherein the predetermined metric is determined by a radius measured from a vertical axis extending through the base of the robot manipulator toward the load multiplied by the mass of the load, thus enabling the robot manipulator that is limited for general operation to a highest-permissible mass for the load on the end effector to be operable with higher masses on the end effector the smaller the radius; and
  activating the robot manipulator via a control unit to execute a predetermined task in consideration of the maximum permissible kinematic variable, such that the end effector or the load on the end effector remains within the maximum permissible workspace if, at beginning of execution of the predetermined task, the end effector or the load on the end effector is located within the maximum permissible workspace.

2. The method as claimed in claim 1, wherein ascertaining the maximum permissible workspace and the maximum permissible kinematic variable of the end effector or the load on the end effector is implemented based on a mass distribution of the robot manipulator and/or a center of gravity of the robot manipulator and/or a mass of the end effector of the robot manipulator and/or a center of gravity of the end effector, respectively.

3. The method as claimed in claim 1, wherein the weight force of the mass of the load is ascertained by static system identification or dynamic system identification.

4. The method as claimed in claim 1, wherein activating the robot manipulator to execute the predetermined task in consideration of the maximum permissible workspace comprises:
  predetermining virtual walls at limits of the maximum permissible workspace; and
  activating the robot manipulator such that a force is exerted on the robot manipulator directed away from the virtual walls during manual guiding of the robot manipulator.

5. The method as claimed in claim 1, wherein activating the robot manipulator for executing the predetermined task in consideration of the maximum permissible workspace and the maximum permissible kinematic variable comprises activating brakes of the robot manipulator, wherein the brakes of the robot manipulator are only opened starting from a closed state when the end effector or the load on the end effector is located within the permissible workspace at beginning of execution of the predetermined task.

6. The method as claimed in claim 1, wherein ascertaining the maximum permissible workspace and the maximum permissible kinematic variable comprises:
  predefining a trajectory of the robot manipulator based on the predetermined task and based on an inertial tensor of the robot manipulator and/or the end effector and/or the load occurring over the trajectory;
  ascertaining a time-dependent acceleration of the robot manipulator and/or the end effector and/or the load from the trajectory as predefined; and
  ascertaining a time-dependent inertial tensor of the robot manipulator and/or the end effector and/or the load from a time-dependent pose of the robot manipulator dependent on the trajectory as predefined.

7. The method as claimed in claim 1, further comprising:
  checking the predetermined task for leaving the maximum permissible workspace by the end effector or by the load and/or for exceeding the maximum permissible kinematic variable of the end effector or the load; and
  outputting an instruction to a user at an output unit of how the predetermined task is capable of being changed so that during the executing of the predetermined task as changed the maximum permissible workspace is not left by the end effector or by the load and the maximum permissible kinematic variable of the end effector or the load is not exceeded.

8. The method as claimed in claim 1, wherein the method comprises implementing a nonlinear optimization search algorithm to ascertain the maximum permissible workspace and the maximum permissible kinematic variable.

9. The method as claimed in claim 8, wherein a starting point of the search algorithm is that angle position of a second joint counted from a distal limb of the robot manipulator at which influence of gravity on the torque at the second joint is maximal.

10. The method as claimed in claim 1, wherein the wrench is a torque generated by the weight force of the mass on joints of the robot manipulator and a base or a pedestal of the robot manipulator, and the joint torque vector is a vector from joint torques of the joints correlated with the wrench.

11. The method as claimed in claim 1, wherein, if the mass of the load is constant and known, the metric solely consists of a limiting value which is compared to the radius.

12. A robot system comprising:
  a robot manipulator having an end effector; and
  a control unit configured to:
    ascertain a wrench or joint torque vector based on a weight force of a mass and/or a force induced by inertia of the mass of a load arranged on the end effector of the robot manipulator;

ascertain a maximum permissible workspace and a maximum permissible kinematic variable of the end effector or the load, each based on the wrench or joint torque vector, wherein the maximum permissible workspace specifies a range for permissible positions of the load on the end effector or of the end effector, so that the wrench or the joint torque vector does not exceed a predetermined metric within the maximum permissible workspace;

wherein the predetermined metric is a limiting value for a torque exerted on a base of the robot manipulator by the weight force of the load, wherein the predetermined metric is determined by a radius measured from a vertical axis extending through the base of the robot manipulator toward the load multiplied by the mass of the load, thus enabling the robot manipulator that is limited for general operation to a highest-permissible mass for the load on the end effector to be operable having higher masses on the end effector the smaller the radius; and activate the robot manipulator to execute a predetermined task in consideration of the maximum permissible kinematic variable, such that the end effector or the load on the end effector remains within the maximum permissible workspace if, at beginning of execution of the predetermined task, the end effector or the load on the end effector is located within the maximum permissible workspace.

13. The robot system as claimed in claim 12, wherein ascertaining the maximum permissible workspace and the maximum permissible kinematic variable of the end effector or the load on the end effector is implemented based on a mass distribution of the robot manipulator and/or a center of gravity of the robot manipulator and/or a mass of the end effector of the robot manipulator and/or a center of gravity of the end effector, respectively.

14. The robot system as claimed in claim 12, wherein the weight force of the mass of the load is ascertained by static system identification or dynamic system identification.

15. The robot system as claimed in claim 12, wherein activation of the robot manipulator to execute the predetermined task in consideration of the maximum permissible workspace comprises the control unit configured to:

predetermine virtual walls at limits of the maximum permissible workspace; and activate the robot manipulator such that a force is exerted on the robot manipulator directed away from the virtual walls during manual guiding of the robot manipulator.

16. The robot system as claimed in claim 12, wherein activation of the robot manipulator to execute the predetermined task in consideration of the maximum permissible workspace and the maximum permissible kinematic variable comprises the control unit configured to activate brakes of the robot manipulator, wherein the brakes of the robot manipulator are only opened starting from a closed state when the end effector or the load on the end effector is located within the permissible workspace at beginning of execution of the predetermined task.

17. The robot system as claimed in claim 12, wherein ascertainment of the maximum permissible workspace and the maximum permissible kinematic variable comprises the control unit configured to:

predefine a trajectory of the robot manipulator based on the predetermined task and based on an inertial tensor of the robot manipulator and/or the end effector and/or the load occurring over the trajectory;

ascertain a time-dependent acceleration of the robot manipulator and/or the end effector and/or the load from the trajectory as predefined; and ascertain a time-dependent inertial tensor of the robot manipulator and/or the end effector and/or the load from a time-dependent pose of the robot manipulator dependent on the trajectory as predefined.

18. The robot system as claimed in claim 12, wherein the control unit is configured to:

check the predetermined task for leaving the maximum permissible workspace by the end effector or by the load and/or for exceeding the maximum permissible kinematic variable of the end effector or the load; and output an instruction to a user at an output unit of how the predetermined task is capable of being changed so that during execution of the predetermined task as changed the maximum permissible workspace is not left by the end effector or by the load and the maximum permissible kinematic variable of the end effector or the load is not exceeded.

19. The robot system as claimed in claim 12, wherein the control unit is configured to implement a nonlinear optimization search algorithm to ascertain the maximum permissible workspace and the maximum permissible kinematic variable.

20. The robot system as claimed in claim 19, wherein a starting point of the search algorithm is that angle position of a second joint counted from a distal limb of the robot manipulator at which influence of gravity on the torque at the second joint is maximal.

21. The robot system as claimed in claim 12, wherein, if the mass of the load is constant and known, the metric solely consists of a limiting value which is compared to the radius.

* * * * *